3,816,482
SULFAMYLBENZOIC ACIDS

Peter Werner Feit, Gentofte, and Ole Bent Tvaermose Nielsen, Vanlose, Denmark, assignors to Lovens Kemiske Fabrik Produktionsaktieselskab Ballerup, Denmark No Drawing. Original application June 16, 1971, Ser. No. 153,879, now Patent No. 3,758,522, dated Sept. 11, 1973. Divided and this application Sept. 13, 1972, Ser. No. 288,764

Int. Cl. C07c *143/78*
U.S. Cl. 260—397.7 R  6 Claims

ABSTRACT OF THE DISCLOSURE

The invention relates to a series of new compounds, their salts and esters and to methods for the preparation of the compounds having the general formula:

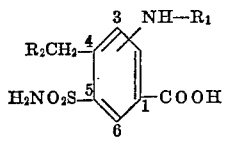

in which the NH—$R_1$ group can be in the 2- or 3-position, $R_1$ represents an aliphatic radical with from 3 to 8 carbon atoms in the chain, or a mononuclear aromatically or a mononuclear heterocyclically substituted methyl or ethyl group, and $R_2$ represents an unsubstituted or substituted phenyl group.

The compounds of the invention possess pronounced diuretic and saluretic activities.

---

This is a division of application Ser. No. 153,879, filed June 16, 1971, now U.S. Pat. 3,758,522, issued Sept. 11, 1973.

This invention relates to a series of new compounds, their salts and esters and to methods for the preparation of the compounds having the general formula:

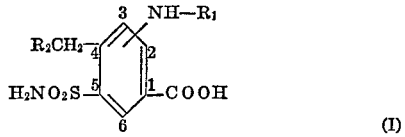

in which the NH—$R_1$ group can be in the 2- or 3-position, $R_1$ represents an aliphatic radical with from 3 to 8 carbon atoms in the chain, or a mononuclear aromatically or a mononuclear heterocyclically substituted methyl or ethyl group, and $R_2$ represents an unsubstituted or substituted phenyl group.

In particular, $R_1$ may represent a straight or branched alkyl radical, having from 3 to 8 carbon atoms, e.g. a propyl, isopropyl, butyl, isobutyl, or tert. butyl radical, or one of the different isomeric pentyl, hexyl, or heptyl radicals, an alkenyl or alkynyl radical, e.g. an allyl, or propargyl radical. In the mononuclear aromatically or mononuclear heterocyclically substituted aliphatic radicals the aromatic part of the radical can be an unsubstituted or substituted phenyl radical and the heterocyclic part of the radical can be a monocyclic radical with one or more oxygen, sulphur and nitrogen atoms as ring members, e.g. 2-, 3- or 4-pyridyl, 2- or 3-furyl or -thienyl, thiazolyl, imidazolyl. Illustrative examples of such aromatically or heterocyclically substituted aliphatic radicals are benzyl, 1- or 2-phenylethyl, furyl-methyl and thienyl-methyl, or the corresponding ethyl radicals.

The substituents $R_1$ and $R_2$ of formula (I) can be substituted in different positions with different groups, such as one or more halogen atoms, e.g. chlorine or bromine atoms, lower alkyl, halo-lower alkyl, e.g. trifluoromethyl, chloromethyl, 2-chloroethyl, dichloromethyl, trichloromethyl or bromomethyl; carboxy, carb(lower)alkoxy or carbamyl radicals; di-lower alkylamino radicals, hydroxy groups, which may be etherified, e.g. lower alkoxy such as methoxy, ethoxy, n-propoxy, isopropoxy, n-butoxy or isobutoxy; or esterified with lower aliphatic carboxylic acids, such as lower alkanoic acids, e.g. acetic, propionic or pivalic acid, lower alkenoic acids, e.g. acrylic or methacrylic acid, lower aliphatic dicarboxylic acids, e.g. oxalic, malonic, succinic, glutaric, adipic, maleic or fumaric acid or their halfesters with lower alkanols, e.g. methanol or ethanol; or etherified mercapto groups such as methylthio, ethylthio, isopropylthio, butylthio or isobutylthio.

Whenever the expression "lower alkyl" is used in the foregoing and in the following it stands for a straight or branched alkyl radical with from 1 to 6 carbon atoms in the chain.

Among the preferred compounds of the invention mention may be made of compounds in which $R_1$ in formula (I) stands for alkyl with from 3 to 5 carbon atoms in the carbon chain, or for benzyl, furylmethyl or thienylmethyl, these examples, however, not being considered limiting for the invention.

The salts of the compounds of the invention are pharmaceutically acceptable salts, and include, for example, alkali metal salts, alkaline earth metal salts, the ammonium salt, or amine salts formed, for instance, from mono-, di- or trialkanolamines or cyclic amines. The esters of the compounds are preferably derived from lower aliphatic alcohols, cyanomethanol and benzylalcohols.

In animal experiments the compounds of the invention possess an outstanding diuretic and saluretic activity. Thus for example, potencies approximately of 50 times that of the well-known furosemide with regard to urinary excretion of water and sodium ions have been demonstrated. Furthermore was observed a very favourable ratio between the excretion of sodium ions and potassium ions which in connection with a low toxicity make the present compounds particularly valuable.

The present compounds are effective after oral, enteral or parenteral administration, and are in human or veterinary practice preferably prescribed in the form of tablets, pills, dragées, or capsules containing the free acid or salts thereof with atoxic bases, or the esters thereof, mixed with carriers and/or auxiliary agents.

Salts, which are soluble in water, may with advantage be administered by injection. The compounds of the invention are useful in the treatment of oedematous conditions e.g. cardiac, hepatic, renal, lung and brain oedema, or oedematous conditions during pregnancy, and of pathological conditions which produce an abnormal retension of the electrolytes of the body, and in the treatment of hypertension.

In pharmaceutical compositions containing the compounds of the invention, organic or inorganic, solid or liquid carriers suitable for oral, enteral or parenteral administration can be used to make up the composition. Gelatine, lactose, starch, magnesium stearate, talc, vegetable and animal fats and oils, gum, polyalkylene glycol, or other known carriers for medicaments are all suitable as carriers.

The compositions may further contain other therapeutic compounds applied in the treatment of, for example oedemas and hypertension, besides the well-known auxiliary agents. Such other compounds may be, for instance, Veratrum- or Rauwolfia alkaloids, e.g. reserpine, rescinnamine or protoveratrine or synthetic hypotensive compounds, e.g. hydralazine, or other diuretics and saluretics, such as the well-known benzothiadiazines, e.g. hydroflumethazide, bendroflumethiazide, and the like. Potassium-sparing diuretics, e.g. triamterene, may also be used in the preparation of the compositions. For some purposes it may be desirable to add small amounts of carboanhydrase inhibitors or aldosterone antagonists, e.g. spironolactone.

In human therapy it has been found that the compounds and their salts shall conveniently be administered in dosage units containing not less than 0.1 mg., and up to 25 mg., preferably in doses of from 0.25 to 2.5 mg., once, twice or thrice a day, calculated as the free acid of formula (I), to achieve the desired activity without simultaneous secondary effects, the prescription, however, always being with due regard to the condition of the patient and under the direction of a medical practitioner.

By the term "dosage unit" is meant a unitary, i.e. a single dose which is capable of being administered to a patient, and which may be readily handled and packed, remaining as a physically stable unit dose comprising either the active material as such or a mixture of it with solid or liquid pharmaceutical diluents or carriers.

If the composition is to be injected, a sealed ampoule, a vial or a similar container may be provided containing a parenterally acceptable aqueous or oily injectable solution or dispersion of the active material as the dosage unit.

The parenteral preparations are in particular useful in the treatment of conditions in which a quick dehydration is desirable, e.g. in the intensive therapy in the case of oedemas in the lung. In the continuous therapy of patients suffering from e.g. hypertension, the tablets or capsules may be the appropriate form of pharmaceutical preparation owing to the prolonged effect obtained when the drug is given orally, in particular in the form of sustained-release tablets.

In the treatment of heat failure and hypertension such tablets may advantageously contain other active components, as specified hereinbefore.

It is another object of the invention to provide a method of producing the compounds of the invention.

In one embodiment compounds of formula (I) are provided in a reaction which comprises the alkylation of a compound of the general formula:

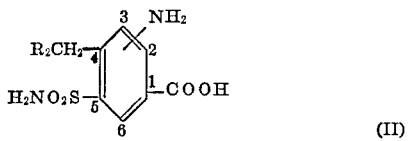

(II)

in which $R_2$ has the meaning hereinbefore defined.

Appropriately the alkylation can be performed either on the free acid of formula (II) or on one of its esters by reaction with a compound of the formula $R_1X$, $R_1$ being as defined before and X being a halogen atom, preferably chlorine or bromine, a hydroxyl group, or a sulphonyloxy group, an alkyl- or arylsulphonyloxy group, the carboxylic acid group subsequently being liberated, if desired.

The alkylation processes are well known to the man skilled in the art and are e.g. described in the complete specification to our South African Pat. No. 69/8,615.

The starting substances of formula (II) are hitherto unknown compounds which can be prepared by several methods of which a preferred method comprises the step of exposing a compound of the general formula:

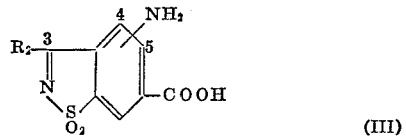

(III)

to the well-known Wolff-Kishner reaction condition, whereafter the corresponding compound of formula (II) is obtained from the reaction mixture after acidification.

Also the compounds of formula (III) are unknown compounds which depending on the position of the amino group attached to the benzene nucleus are provided by different methods. Thus, when the amino group is placed in the 4-position, 4-carbethoxy-2,6-dinitrobenzoic acid is used as starting material in a preferred route for the preparation of the compound of formula (III). This starting material is transformed into the corresponding acid chloride by treatment with a chlorinating agent, such as thionyl chloride or phosphorous chlorides. By treatment of this acid chloride with benzene and aluminum chloride under well-known conditions and isolation of the reaction product, ethyl 4-benzoyl-3,5-dinitrobenzoate is obtained. By replacing the benzene in the reaction above with substituted benzene the corresponding ethyl 4-(substituted benzoyl)-3,5-dinitrobenzoate is obtained.

After saponification to the corresponding free acid, this is partially reduced by means of a reducing agent, such as an alkali dithionite whereby only one of the nitro groups is converted into an amino group. The obtained 5-amino-4-benzoyl-3-nitrobenzoic acid is subjected to a Meerwein-reaction, whereby 4-benzoyl-5-chlorosulphonyl-3-nitrobenzoic acid is obtained, which after treatment with ammonia yields the corresponding 5-sulphonamide of the general formula:

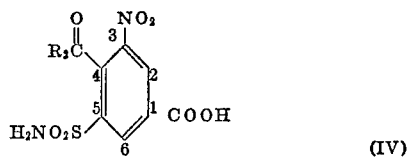

(IV)

in which $R_2$ has the meaning hereinbefore defined. After a further reduction of the nitro group in the 3-position, for instance with an excess of sodium-dithionite, and at slightly elevated temperature, a ring closure takes place preferably under acidic conditions and the compound of formula (III) is obtained, having the amino group in the 4-position.

Optionally, the compound of formula (IV) can directly be converted into the desired starting substance of formula (II), the nitro group being reduced while performing the Wolff-Kishner reaction mentioned hereinbefore.

The compounds of formula (III) in which the amino group is placed in the 5-position are appropriately obtained from 4-acetamino-2-chloro-5-nitrobenzoic acid as starting material. This compound is converted into the corresponding benzoyl chloride by treatment with a chlorinating agent such as thionyl chloride which by treatment with benzene and aluminum chloride is converted into the corresponding 4-acetamino-2-chloro-5-nitrobenzophenone. By an acidic hydrolysis 4-amino-2-chloro-5-nitrobenzophenone is obtained.

By diazotation and treatment with cuprous cyanide the amino group of the above-mentioned compound is converted into a nitril, which again by an acid hydrolysis is transferred into the corresponding acid. This 4-benzoyl-5-chloro-2-nitrobenzoic acid is by reacting with benzylmercaptane converted to the corresponding 5-benzylthio compound which by an oxidative chlorination using chlorine in e.g. acetic acid yields the 5-chlorosulphonyl derivative. By treatment of this reaction product with ammonia below or at room temperature an intermediate is formed which without isolation and under simultaneous ring closure is converted into 6-carboxy-5-nitro-3-phenyl-1,2-benzisothiazole-1,1-dioxide. The nitro group of this compound is reduced to an amino group by a mild reduction for instance with ferrosulphate in ammonium hydroxide, whereby the compound of formula (III) is obtained. The substituted 3-phenyl-derivatives are prepared in analogous reactions.

In another embodiment of the invention the compounds of formula (I) are obtained by exposing a compound of the general formula:

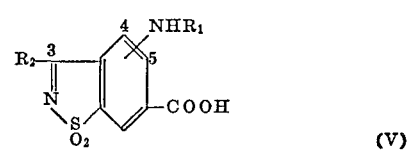

(V)

in which $R_1$ and $R_2$ have the meaning hereinbefore defined to Wolff-Kishner reaction conditions. The compounds of formula (V) are known compounds the preparation of which is described in our British Patent Application No. 31718/70.

The compounds of formula (I) thus produced in the various embodiments may be obtained in the form of the free acid, its salts or one of its esters, of which the esters, if desired, are saponified and vice verse.

For use in the therapy various pharmaceutically acceptable esters of the compounds of formula (I) are interesting, as for instance esters with lower aliphatic alcohols, including diethylaminoethanol, and with other well-known and commonly used non-toxic alcohols.

The invention will now be illustrated by the following non-limiting examples from which the details of the embodiments will be apparent.

EXAMPLE 1

2-amino-4-benzyl-5-sulfamylbenzoic acid (A) 4-acetamino-2-chloro - 5 - nitrobenzophenone.—A mixture of 4-acetamino-2-chloro-5-nitrobenzoic acid (26 g.) and thionyl chloride (100 ml.) is refluxed for about 1 hour, and the resulting solution evaporated *in vacuo*. The crude 4-acetamino-2-chloro-5-nitrobenzoyl chloride obtained is dissolved in dry benzene (300 ml.) and anhydrous aluminum chloride (26 g.) is added in portions, while stirring vigorously at 40–50° C. The mixture is stirred at room temperature for about 20 hours and then refluxed for about 1 hour. The resulting solution is poured into a mixture of ice (about 1 kg.) and concentrated hydrochloric acid (50 ml.). The resulting precipitate is filtered off and dissolved in chloroform (about 500 ml.), which is washed with water, dried ($MgSO_4$) and evaporated *in vacuo*. The residue is crystallized from ethanol and collected by filtration. After drying and recrystallization from a mixture of ethanol and methyl Cellosolve, 4-acetamino-2-chloro-5-nitrobenzophenone is obtained with a melting point of 182–183° C. From the benzene layer of the mother liquors a further crop with the same melting point can be obtained.

(B) 4 - amino-2-chloro - 5 - nitrobenzophenone.—A mixture of 4-acetamino-2-chloro - 5 - nitrobenzophenone (22 g.), ethanol (300 ml.) and concentrated hydrochloric acid (200 ml.) is refluxed for about 2 hours. On cooling, the separated oil crystallizes. The material is collected by filtration and washed with cold aqueous ethanol. After drying and recrystallization from aqueous ethanol, 4-amino-2-chloro-5-nitrobenzophenone is obtained with a melting point of 149–150° C.

(C) 2 - chloro - 4 - cyano-5-nitrobenzophenone.—A solution of 4-amino-2-chloro-5-nitrobenzophenone (13.8 g.) in acetic acid (100 ml.) is slowly added to nitrosylsulfuric acid prepared from sodium nitrite (4.0 g.) and concentrated sulfuric acid (28 ml.), while stirring at room temperature. The resulting diazonium-solution is stirred at room temperature for a further 2 hours, and is then added dropwise to a solution of potassium cyanide (50 g.), cuprous cyanide (25 g.) and anhydrous sodium carbonate (250 g.) in water (700 ml.) in the presence of an upper benzene layer and while stirring vigorously at 65–70° C. After the addition is completed, the mixture is stirred until it has reached room temperature. The benzene layer is then separated and the aqueous layer extracted twice with benzene. The combined benzene fractions are washed with water, dried ($MgSO_4$) and evaporated *in vacuo*. The residue is crystallized with ethanol, filtered off and washed with ethanol and with petroleum ether. After drying and recrystallization from a mixture of ethanol and methyl Cellosolve, 2-chloro-4-cyano-5-nitrobenzophenone is obtained with a melting point of 133–135° C.

(D) 4-benzoyl - 5 - chloro - 2 - nitrobenzoic acid.—To the crude 4-cyano-2-chloro - 5 - nitrobenzophenone (about 75 g.) prepared from 4-amino-2-chloro-5-nitrobenzophenone (94 g.) as described in Example 1 step C, concentrated sulfuric acid (650 ml.) and water (450 ml.) is added, and the mixture stirred at 180–185° C. for 2 hours. After cooling, water (about 1 l.) is added and the mixture is left in a refrigerator for about 20 hours. The separated material is collected by filtration and washed with water. It is then extracted with boiling sodium hydrogen carbonate solution (saturated, about 500 ml.) which is filtered hot in the presence of decolourizing carbon. The filtrate is cooled and then carefully acidified with concentrated hydrochloric acid (100 ml.). The resulting precipitate is filtered off and washed with water. After drying and recrystallization from aqueous ethanol, 4-benzoyl-5-chloro-2-nitrobenzoic acid is obtained with a melting point of 209–211° C.

(E) 4 - benzoyl - 5 - benzylthio-2-nitrobenzoic acid.—A mixture of 4-benzoyl-5-chloro-2-nitrobenzoic acid (35 g.), sodium hydrogen carbonate (30 g.), benzylmercaptane (30 ml.) and water (300 ml.) is heated on a steam bath for about 6 hours. The mixture is then cooled and carefully acidified with concentrated hydrochloric acid (50 ml.). The separated oil is extracted with diethyl ether (about 500 ml.) which is washed with water, dried ($MgSO_4$) and evaporated *in vacuo*. The residue is crystallized by trituration with petroleum ether, collected by filtration and washed with petroleum ether. After drying and recrystallization from aqueous ethanol, 4-benzoyl-5-benzylthio-2-nitrobenzoic acid is obtained with a melting point of 156–157° C.

(F) 6 - carboxy - 5 - nitro-3-phenyl-1,2-benzisothiazole-1,1-dioxide.—A mixture of 4-benzoyl-5-benzylthio-2-nitrobenzoic acid (43 g.) and acetic acid (250 ml.) containing water (8 ml.) is cooled to about 5° C. An excess of chlorine is then bubbled through the stirred mixture, keeping the temperature below 15° C. After about 3.5 hours, excess chlorine is blown out of the reaction mixture with a stream of nitrogen, followed by dilution with cold water (250 ml.). The precipitated 4-benzoyl-5-chlorosulfonyl-2-nitrobenzoic acid is collected by filtration and washed with cold water. The damp filter cake is added in portions to concentrated ammonium hydroxide (400 ml.), while stirring at 10–12° C. After additional stirring at room temperature for about 20 hours, the reaction mixture is carefully acidified with concentrated hydrochloric acid (about 75 ml.). The resulting precipitate is collected by filtration and washed with water. After drying, the material is suspended in ethanol (100 ml.) and stirred at room temperature for 1 hour. After filtration, drying and recrystallization from ethanol, 6-carboxy-5-nitro-3-phenyl-1,2-benzisothiazole - 1,1 - dioxide is obtained with a melting point of 277–280° C. (dec.).

(G) 5 - amino - 6 - carboxy-3-phenyl-1,2-benzisothiazole-1,1-dioxide.—A solution of 6-carboxy-5-nitro-3-phenyl-1,2-benzisothiazole-1,1-dioxide (3.3 g.) in concentrated ammonium hydroxide (70 ml.) is added in portions to a warm solution of ferrosulfate heptahydrate (20 g.) in water (60 ml.). The reaction mixture is heated on a steam bath for a further 20 minutes and is then filtered hot. The filtrate is concentrated *in vacuo* to about 50 ml. and is then carefully acidified to pH=2.0 with hydrochloric acid. The resulting precipitate is collected by filtration and washed with water. After drying and recrystallization from a mixture of ethanol and methyl Cellosolve, 5 - amino-6-carboxy-3-phenyl-1,2-benzisothiazole-1,1-dioxide is obtained with a melting point higher than 285° C.

(H) 2 - amino - 4 - benzyl-5-sulfamylbenzoic acid.—A mixture of 5-amino-6-carboxy-3-phenyl-1,2-benzisothiazole-1,1-dioxide (3.0 g.), 80% aqueous hydrazine hydrate (6.0 ml.), potassium hydroxide (2.0 g.), water (4.0 ml.) and diethylene glycol (25 ml.) is stirred at 130–140° C. for 3 hours. The temperature is then slowly raised to 215° C. allowing volatile material to distill off. The stirring at 215° C. is continued for a further 3 hours. After cooling and dilution with water (20 ml.), the reaction mixture is acidified with concentrated hydrochloric acid (5 ml.). The resulting precipitate is collected by filtration and washed with water. After drying, and recrystallization from ethanol 2-amino-4-benzyl-5-sulfamylbenzoic acid is obtained with a melting point of 253–255° C. (dec.).

EXAMPLE 2

3-amino-4-benzyl-5-sulfamylbenzoic acid (A) Ethyl 4-benzoyl-3,5-dinitrobenzoate.—A mixture of 4-carbethoxy-2,6-dinitrobenzoic acid (85 g.), thionyl-chloride (85 ml.) and pyridine (0.25 ml.) is refluxed for about 3 hours. The resulting solution is evaporated *in vacuo* and the remaining 4-carbethoxy-2,6-dinitrobenzoyl chloride is dissolved in dry benzene (130 ml.). Anhydrous aluminum chloride (50 g.) is then added in portions to the refluxing solution while stirring vigorously. After the addition is completed, the mixture is stirred and refluxed for a further 2 hours. After cooling to about 50° C., methylene chloride (250 ml.) is added followed by a mixture of ice (250 g.) and concentrated hydrochloric acid (150 ml.). After additional stirring for about 1 hour, the organic layer is separated, washed with water and evaporated *in vacuo*. The residue is triturated with hot ethanol (200 ml.) and, after cooling, the resulting precipitate is collected by filtration, and washed with cold ethanol followed by petroleum ether. After drying and recrystallization from methyl Cellosolve, ethyl 4-benzoyl-3,5-dinitro-benzoate is obtained with a melting point of 172–173° C.

(B) 4-benzoyl-3,5-dinitrobenzoic acid.—To a stirred suspension of ethyl 4-benzoyl-3,5-dinitrobenzoate (160 g.) in ethanol (800 ml.), 2 N sodium hydroxide (260 ml.) is added dropwise within 15 minutes. After additional stirring for 10 minutes, the resulting solution is clarified by filtration and is then acidified by the addition of 4 N hydrochloric acid (150 ml.). After cooling, the resulting precipitate is collected by filtration and washed with water. After drying and recrystallization from aqueous ethanol, 4-benzoyl-3,5-dinitrobenzoic acid is obtained with a melting point of 248–251° C. (dec.).

(C) 5-amino-4-benzoyl-3-nitrobenzoic acid.—A mixture of 4-benzoyl-3,5-dinitrobenzoic acid (110 g.) and pyridine (220 ml.) is heated on a steam bath for about 15 minutes to afford the formation of the pyridinium-salt. Water (440 ml.) is then added and the mixture is cooled to 20–22° C. To the stirred mixture, sodium dithionite (124 g.) is then added in portions during 7–8 minutes keeping the temperature at 20–22° C. After the addition is completed the stirring is continued for a further 6–7 minutes allowing the temperature to drop to 12–15° C. The resulting red solution is carefully acidified with concentrated hydrochloric acid (380 ml.) keeping the temperature below 22° C. The reaction mixture is left at room temperature for about 20 hours. The precipitated material is then collected by filtration and washed with water. After recrystallization from acetonitrile, 5-amino-4-benzoyl-3-nitrobenzoic acid is obtained with a melting point of 203–204° C. (dec.).

(D) 4-benzoyl-3-nitro-5-sulfamylbenzoic acid.—A mixture of 5-amino-4-benzoyl-3-nitrobenzoic acid (28.6 g.) and concentrated hydrochloric acid (100 ml.) is heated on a steam bath for about 10 minutes and then cooled. The amine is diazotized by dropwise addition of a solution of sodium nitrite (7.6 g.) in water (40 ml.) while stirring at 0–5° C. The resulting diazonium-mixture is poured into a solution of cupric chloride dihydrate (4.0 g.) in water (15.0 ml.) and acetic acid (140 ml.) saturated with SO₂, while stirring at room temperature. The stirring is continued for a further 1 hour and the mixture is then diltued with cold water (300 ml.). The precipitated 4-benzoyl-5-chlorosulfonyl-3-nitro-benzoic acid is collected by filtration and washed with water. The damp filter-cake is then added in portions to concentrated ammonium hydroxide (300 ml.) while stirring at 10–12° C. After additional stirring at room temperature for about 20 hours, the solution is carefully acidified to pH=2.0 with concentrated hydrochloric acid. The resulting precipitate is collected by filtration and washed with water. After drying and recrystallization from aqueous ethanol, 4-benzoyl-3-nitro-5-sulfamylbenzoic acid is obtained with a melting point of 234–235° C.

(E) 4-amino-6-carboxy-3-phenyl-1,2-benzisothiazole-1,1-dioxide.—To a stirred solution of 4-benzoyl-3-nitro-5-sulfamylbenzoic acid (7.0 g.) in a mixture of pyridine (15 ml.) and water (50 ml.), sodium dithionite (14 g.) is added in portions. The mixture is heated on a steam bath for about 1 hour and is then evaporated *in vacuo*. The remaining material is dissolved in hot water (about 50 ml.) and the solution is acidified with concentrated hydrochloric acid (15 ml.). The mixture is heated on a steam bath for 15 minutes and left at room temperature for about 20 hours. The resulting precipitate is collected by filtration and washed with water. After drying and recrystallization from a mixture of acetonitrile and methyl Cellosolve, 4-amino-6-carboxy-3-phenyl-1,2-benzisothiazole-1,1-dioxide is obtained with a melting point of 287–288° C. (dec.).

(F) 3-amino-4-benzyl-5-sulfamylbenzoic acid.—By replacing in Example 1 step (H) 5-amino-6-carboxy-3-phenyl-1,2-benzisothiazole-1,1-dioxide by 4-amino-6-carboxy-3-phenyl-1,2-benzisothiazole-1,1-dioxide, 3-amino-4-benzyl-5-sulfamyl-benzoic acid is obtained with a melting point of 285–286° C. (dec.).

EXAMPLE 3

3-amino-4-(4'-methylbenzyl)-5-sulfamylbenzoic acid (A) Ethyl 3,5-dinitro-4-(4'-methylbenzoyl)-benzoate.—To a solution of 2,6-dinitro-4-carbethoxybenzoyl chloride (prepared from 2,6-dinitro-4-carbethoxybenzoic acid (110 g.) according to the procedure described in Example 2 step (A) in a mixture of dry toluene (550 ml.) and carbondisulfide (550 ml.), anhydrous aluminum chloride (160 g.) is added in portions while stirring vigorously at room temperature. After the addition is completed, the stirring is continued for a further 2 hours followed by refluxing for 2 hours. The mixture is then poured into a mixture of ice (about 2 kg.) and concentrated hydrochloric acid (500 ml.). After dilution with methylene chloride (500 ml.), the organic layer is separated, washed with water and evaporated *in vacuo*. The residue is triturated with hot ethanol (300 ml.) and, after cooling, the resulting precipitate is collected by filtration and washed with cold ethanol followed by petroleum ether. After drying and recrystallization from a mixture of ethanol and methyl Cellosolve, ethyl 3,5-dinitro-4-(4'-methylbenzoyl)-benzoate is obtained with a melting point of 177.5–179° C.

(B) 3,5-dinitro-4-(4'-methylbenzoyl)-benzoic acid.—By replacing in Example 2 step (B) ethyl 4-benzoyl-3,5-dinitrobenzoate by ethyl 3,5-dinitro-4-(4'-methylbenzoyl)-benzoate, 3,5-dinitro-4-(4'-methylbenzoyl)-benzoic acid is obtained with a melting point of 266–268° C.

(C) 5-amino-4-(4'-methylbenzoyl)-3-nitrobenzoic acid.—By replacing in Example 2 step (C) 4-benzoyl-3,5-dinitrobenzoic acid by 3,5-dinitro-4-(4'-methylbenzoyl)-benzoic acid, 5-amino-4-(4'-methylbenzoyl)-3-nitrobenzoic acid is obtained with a melting point of 223.5–225° C.

(D) 4-(4'-methylbenzoyl)-3-nitro-5-sulfamylbenzoic acid.—By replacing in Example 2 step (D) 5-amino-4-benzoyl-3-nitrobenzoic acid by 5-amino-4-(4'-methylbenzoyl)-3-nitrobenzoic acid, 4-(4'-methylbenzoyl)-3-nitro-5-sulfamylbenzoic acid is obtained with a melting point of 231–232° C.

(E) 4-amino-6-carboxy-3-(4'-methylphenyl)-1,2-benzisothiazole-1,1-dioxide.—By replacing in Example 1 step (G) 6-carboxy-5-nitro-3-phenyl-1,2-benzisothiazole-1,1-dioxide by 4-(4'-methylbenzoyl)-3-nitro-5-sulfamyl-benzoic acid, 4-amino-6-carboxy-3-(4'-methylphenyl)-1,2-benzisothiazole-1,1-dioxide is obtained with a melting point of 321.5–324.5° C. (dec.).

(F) 3-amino - 4 - (4'-methylbenzyl)-5-sulfamylbenzoic acid.—By replacing in Example 1 step (H) 5-amino-6-carboxy-3-phenyl - 1,2 - benzisothiazole-1,1-dioxide by 4-amino - 6 - carboxy-3-(4'-methylphenyl)-1,2-benzisothiazole-1,1-dioxide, 3-amino-4-(4'-methylbenzyl) - 5 - sulfamylbenzoic acid is obtained with a melting point of 296–298° C.

EXAMPLE 4

3-amino-4-(2',4'-dimethylbenzyl)-5-sulfamylbenzoic acid (A) Ethyl 4-(2',4'-dimethylbenzoyl)-3,5-dinitro benzoate.—By replacing in Example 2 step (A) the benzene by meta-xylene and performing the reaction at 100° C., ethyl 4-(2',4'-dimethylbenzoyl)-3,5-dinitrobenzoate is obtained with a melting point of 155.5–157.5° C.

(B) 4 - (2',4' - dimethylbenzoyl) - 3,5 - dinitrobenzoic acid.—By replacing in Example 2 step (B) the ethyl 4-benzoyl-3,5-dinitrobenzoate by ethyl 4 - (2',4'-dimethylbenzoyl)-3,5-dinitrobenzoate, 4 - (2',4'-dimethylbenzoyl)-3,5-dinitrobenzoic acid is obtained with a melting point of 243–245° C.

(C) 5-amino-4-(2',4'-dimethylbenzoyl) - 3 - nitrobenzoic acid.—By replacing in Example 2 step (C) 4-benzoyl-3,5-dinitrobenzoic acid by 4-(2',4'-dimethylbenzoyl)-3,5-dinitrobenzoic acid, 5-amino-4-(2',4'-dimethylbenzoyl)-3-nitrobenzoic acid is obtained with a melting point of 245–247° C.

(D) 4-(2',4'-dimethylbenzoyl) - 3 - nitro-5-sulfamylbenzoic acid.—By replacing in Example 2 step (D) 5-amino-4-benzoyl - 3 - nitrobenzoic acid by 5-amino-4-(2',4'-dimethylbenzoyl) - 3 - nitrobenzoic acid, 4-(2',4'-dimethylbenzoyl) - 3 - nitro-5-sulfamylbenzoic acid crystallizing with 1 mole of acetonitrile is obtained with a melting point of 236–238° C.

(E) 3-amino - 4 - (2',4'-dimethylbenzyl)-5-sulfamylbenzoic acid.—By replacing in Example 1 step (H) 5-amino - 6 - carboxy-3-phenyl-1,2-benzisothiazole-1,1-dioxide by 4-(2',4'-dimethylbenzoyl)-3-nitro-5-sulfamylbenzoic acid, 3 - amino-4-(2',4'-dimethylbenzyl)-5-sulfamylbenzoic acid is obtained as a hydrate with a melting point of 265–267° C.

EXAMPLE 5

3-amino-4-(4'-chlorobenzyl)-5-sulfamylbenzoic acid (A) Ethyl 4-(4'-chlorobenzoyl)-3,5-dinitrobenzoate.—By replacing in Example 2 step (A) benzene by chlorobenzene and performing the reaction at 80° C., ethyl 4-(4'-chlorobenzoyl)-3,5-dinitrobenzoate is obtained with a melting point of 162.5–164° C.

(B) 4-(4'-chlorobenzoyl)-3,5-dinitrobenzoic acid.—By replacing in Example 2 step (B) ethyl 4-benzoyl-3,5-dinitrobenzoate by ethyl 4-(4'-chlorobenzoyl)-3,5-dinitrobenzoate, 4-(4'-chlorobenzoyl)-3,5-dinitrobenzoic acid is obtained with a melting point of 266–267° C.

(C) 5-amino-4-(4'-chlorobenzoyl) - 3 - nitrobenzoic acid.—By replacing in Example 2 step (C) 4-benzoyl-3,5-dinitrobenzoic acid by 4-(4'-chlorobenzoyl)-3,5-dinitrobenzoic acid, 5-amino-4-(4'-chlorobenzoyl) - 3 - nitro benzoic acid crystallizing with 1 mole of acetonitrile is obtained with a melting point of 239–241° C.

(D) 4-(4'-chlorobenzoyl) - 3 - nitro-5-sulfamylbenzoic acid.—By replacing in Example 2 step (D) 5-amino-4-benzoyl-3-nitrobenzoic acid by 5-amino-4-(4'-chlorobenzoyl)-3-nitrobenzoic acid, 4-(4'-chlorobenzoyl)-3-nitro-5-sulfamylbenzoic acid is obtained with a melting point of 234.5–235.5° C.

(E) 3-amino-4-(4'-chlorobenzyl) - 5 - sulfamylbenzoic acid.—By replacing in Example 1 step (H) 5-amino-6-carboxy-3-phenyl-1,2-benzisothiazole-1,1-dioxide by 4-(4'-chlorobenzoyl)-3-nitro-5-sulfamylbenzoic acid, 3-amino-4-(4'-chlorobenzyl)-5-sulfamylbenzoic acid is obtained as a semihydrate with a melting point of 304–306° C.

EXAMPLE 6

4-benzyl-2-benzylamino-5-sulfamylbenzoic acid

A solution of 2-amino-4-benzyl-5-sulfamylbenzoic acid (1.0 g.) and benzylbromide (1.0 ml.) in methyl Cellosolve (5.0 ml.) is heated on a steam bath for 20 hours. After cooling, water (5.0 ml.) is added and the resulting precipitate is collected by filtration and washed with water. After drying and recrystallization from methyl Cellosolve, 4-benzyl-2-benzylamino-5-sulfamylbenzoic acid is obtained with a melting point of 256–258° C. (dec.).

EXAMPLE 7

4-benzyl-3-benzylamino-5-sulfamylbenzoic acid

A solution of 3-amino-4-benzyl-5-sulfamylbenzoic acid (1.5 g.) and benzylbromide (1.5 ml.) in methyl Cellosolve (5.0 ml.) is heated on a steam bath for 18 hours. 4 N sodium hydroxide (5.0 ml.) is then added and the heating is continued for a further 30 minutes. After cooling, the solution is acidified with 4 N hydrochloric acid (6.0 ml.). The resulting precipitate is collected by filtration and washed with water. After drying and recrystallization twice from ethanol, 4-benzyl-3-benzylamino-5-sulfamylbenzoic acid is obtained with a melting point of 248–249° C. (dec.).

EXAMPLE 8

Ethyl 3-benzylamino-4-(4'-methylbenzyl)-5-sulfamylbenzoate

A solution of 3-amino-4-(4'-methylbenzyl)-5-sulfamylbenzoic acid (1.0 g.) and benzylbromide (1.0 ml.) in ethanol (10 ml.) is refluxed for 48 hours. After 24 hours, additional benzylbromide (1.0 ml.) is added. The resulting solution is evaporated *in vacuo* and the residue crystallized by trituration with ethanol (5 ml.). The material is collected by filtration and dried. After recrystallization from ethanol, ethyl 3-benzylamino-4-(4'-methylbenzyl)-5-sulfamylbenzoate is obtained with a melting point of 151.5–153.5° C.

EXAMPLE 9

3-benzylamino-4-(4'-methylbenzyl)-5-sulfamylbenzoic acid

A mixture of ethyl 3-benzylamino-4-(4'-methylbenzyl)-5-sulfamylbenzoate (0.55 g.) and 2 N sodium hydroxide (5.5 ml.) is heated on a steam bath for 15 minutes. The resulting solution is cooled and then acidified with 4 N hydrochloric acid (3.0 ml.). The resulting precipitate is collected by filtration and washed with water. After drying and recrystallization from ethanol, 3-benzylamino-4-(4'-methylbenzyl)-5-sulfamylbenzoic acid is obtained with a melting point of 236–237° C.

EXAMPLES 10–11

By replacing in Example 8 3-amino-4-(4'-methylbenzyl)-5-sulfamylbenzoic acid by 3-amino-4-(2',4'-dimethylbenzyl)-5-sulfamylbenzoic acid and 3-amino-4-(4'-chlorobenzyl)-5-sulfamylbenzoic acid, respectively, ethyl 3-benzylamino-4-(2',4'-dimethylbenzyl) - 5 - sulfamylbenzoate and ethyl 3-benzylamino-4-(4'-chlorobenzyl)-5-sulfamylbenzoate are obtained with melting points of 150–151° C. and 168.5–170.5° C. respectively.

EXAMPLES 12–13

By replacing in Example 9 ethyl 3-benzylamino-4-(4'-methylbenzyl)-5-sulfamylbenzoate by the ethyl esters of Examples 10 and 11, 3-benzylamino-4-(2',4'-dimethylbenzyl)-5-sulfamylbenzoic acid and 3-benzylamino-4-(4'-chlorobenzyl)-5-sulfamylbenzoic acid are obtained with melting points of 245–248° C. and 263.5–265° C. respectively.

EXAMPLE 14

Ethyl 3-allylamino-4-benzyl-5-sulfamylbenzoate

A solution of 3-amino-4-benzyl-5-sulfamylbenzoic acid (2.0 g.) and allylbromide (2.0 ml.) in ethanol (30 ml.) is refluxed for 72 hours. After 24 hours and 48 hours additional amounts of allylbromide (each time 2.0 ml.) are added. After cooling, the precipitated material is collected by filtration and washed with cold ethanol followed by petroleum ether. After drying and recrystallization from aqueous ethanol, ethyl 3-allylamino-4-benzyl-5-sulfamylbenzoate is obtained with a melting point of 131.5–133.5° C.

EXAMPLE 15

3-allylamino-4-benzyl-5-sulfamylbenzoic acid

By replacing in Example 9 ethyl 3-benzylamino-4-(4'-methylbenzyl)-5-sulfamylbenzoate by ethyl 3-allylamino-4-benzyl-5-sulfamylbenzoate, 3-allylamino - 4 - benzyl-5-sulfamylbenzoic acid is obtained with a melting point of 216–218° C.

EXAMPLE 16

4-benzyl-3-$n$-propylamino-5-sulfamylbenzoic acid 3-allylamino-4-benzyl-5-sulfamylbenzoic acid (0.95 g.) dissolved in ethanol (15 ml.) is hydrogenated at room temperature in the presence of $PtO_2$ (0.1 g.). After about 10 minutes, the theoretical amount of hydrogen has been absorbed and the uptake becomes negligible. The catalyst is removed by filtration and the reaction product is precipitated from the filtrate by addition of water (10 ml.). The precipitate is collected by filtration and washed with aqueous ethanol. After drying and recrystallization from acetonitrile, 4-benzyl - 3 - $n$-propylamino-5-sulfamylbenzoic acid is obtained with a melting point of 237–238° C.

EXAMPLE 17

4-benzyl-3-(2',3'-dibromopropylamino)-5-sulfamylbenzoic acid

To a stirred suspension of 3-allylamino-4-benzyl-5-sulfamylbenzoic acid (1.74 g.) in acetic acid (25 ml.), a solution of bromine (0.9 g.) in acetic acid (10 ml.) is added dropwise within 30 minutes. After additional stirring for 30 minutes, the resulting solution is slowly diluted with water (about 75 ml.) to precipitate the reaction product. The precipitate is collected by filtration and washed with water. After drying and recrystallization twice from aqueous ethanol, 4-benzyl-3-(2',3'-dibromopropylamino)-5-sulfamylbenzoic acid is obtained with a melting point of 176–177° C.

EXAMPLE 18

4-benzyl-3-(2'-bromoallylamino)-5-sulfamylbenzoic acid

A solution of 4-benzyl-3-(2',3'-dibromopropylamino)-5-sulfamylbenzoic acid (0.8 g.) in 2 N sodium hydroxide (20 ml.) is left at room temperature for 24 hours protected against light. The solution is then acidified with 4 N hydrochloric acid (10.5 ml.), and the resulting precipitate is collected by filtration and washed with water. After drying and recrystallization twice from aqueous ethanol, 4-benzyl - 3 - (2'-bromoallylamino)-5-sulfamylbenzoic acid is obtained with a melting point of 230–232° C.

EXAMPLE 19

$n$-Butyl 4-benzyl-3-$n$-butylamino-5-sulfamylbenzoate

A solution of 3-amino-4-benzyl-5-sulfamylbenzoic acid (1.4 g.) and di-$n$-butyl sulfate (5.5 ml.) in dry toluene (14 ml.) is refluxed for 32 hours. After cooling, the resulting precipitate is collected by filtration and washed with cold toluene followed by petroleum ether. After drying and recrystallization twice from aqueous ethanol, $n$-butyl - 4 - benzyl-3-$n$-butylamino-5-sulfamylbenzoate is obtained with a melting point of 111–113° C.

EXAMPLE 20

4-Benzyl-3-$n$-butylamino-5-sulfamylbenzoic acid

By replacing in Example 9 ethyl 3-benzylamino-4-(4'-methylbenzyl)-5-sulfamylbenzoate by $n$-butyl 4-benzyl-3-$n$-butylamino-5-sulfamylbenzoate, 4-benzyl 3-$n$-butylamino-5-sulfamylbenzoic acid is obtained with a melting point of 234–235° C.

EXAMPLE 21

Sodium salt of 4-benzyl-3-$n$-butylamino-5-sulfamylbenzoic acid

To a suspension of 3-amino-4-benzyl-5-sulfamylbenzoic acid (13.5 g.) in $n$-butanol (400 ml.), concentrated sulphuric acid (3.0 ml.) is added. The reaction mixture is then refluxed under such conditions that the water formed during the reaction is separated. When the NMR spectrum of a sample of the reaction mixture diluted with $n$-butanol shows that more than 90% of the $n$-butyl 3-amino-4-benzyl-5-sulfamylbenzoate intermediate formed is converted into the corresponding 3-$n$-butylaminobenzoate (which causes a frequence shift to higher field of the two doublets of the aromatic protons of the ring carrying the sulfamyl-group) 2 N sodium hydroxide (100 ml.) is added and the mixture refluxed for a further 30 minutes. After this saponification, the reaction mixture is neutralized to a pH of 8 by the addition of hydrochloric acid. After cooling, the resulting precipitate is filtered off, washed with a minor amount of ice-cold water and dried. After recrystallization from water, the sodium salt of 4-benzyl-3-$n$-butylamino-5-sulfamylbenzoic acid is obtained as a dihydrate with a melting point of 285–290° C. (dec.) after loss of water of crystallization at about 110° C.

EXAMPLE 22

4-benzyl-3-$n$-butylamino-5-sulfamylbenzoic acid

Sodium 4 - benzyl-3-$n$-butylamino-5-sulfamylbenzoate dihydrate (11.0 g.) is dissolved in hot water (110 ml.) and the solution is acidified with acetic acid (10 ml.). The resulting precipitate is, after cooling, collected by filtration and washed with water. After drying and recrystallization from aqueous ethanol, 4-benzyl-3-$n$-butylamino-5-sulfamylbenzoic acid is obtained with a melting point of 234–235° C. The material (IR, analysis) is identical with the material prepared as in Example 20.

EXAMPLE 23

4-benzyl-3-n-pentylamino-5-sulfamylbenzoic acid

By replacing in Example 21 the $n$-butanol by $n$-pentanol, 4-benzyl-3-$n$-pentylamino-5-sulfamylbenzoic acid is obtained with a melting point of 231.5–233° C.

EXAMPLE 24

4-benzyl-3-(pyridyl-(2)-methylamino)-5-sulfamylbenzoic acid

A mixture of 3-amino-4-benzyl-5-sulfamylbenzoic acid (1.02 g.), pyridine-2-aldehyde (0.40 g.), p-toluenesulphonic acid (0.01 g.) and acetic acid (20 ml.) is hydrogenated in the presence of $PtO_2$ (0.1 g.). After about 2 hours the theoretical amount of hydrogen has been absorbed and the uptake becomes negligible. The mixture is then heated on a steam bath and filtered hot to remove the catalyst. The filtrate is evaporated *in vacuo* and the residue is crystallized by trituration with ethanol (10 ml.). The material is collected by filtration and washed with ethanol. After drying and recrystallization from a mixture of ethanol and methyl Cellosolve, 4-benzyl-3-(pyridyl-(2)-methylamino)-5-sulfamylbenzoic acid crystallizing with 0.25 mole of water is obtained with a melting point of 248–249° C. (dec.).

EXAMPLE 25

3-(furyl-(2)-methylamino)-4-(4'-methylbenzyl)-5-sulfamylbenzoic acid and its sodium salt A mixture of 3-amino-4-(4'-methylbenzyl)-5-sulfamylbenzoic acid (3.2 g., 0.01 mole), 2 N sodium hydroxide (5.0 ml.) and ethanol (150 ml.) is evaporated *in vacuo*. The precipitated sodium salt is dissolved in methanol (50 ml.), furfural (1.5 ml.) is added and the mixture is refluxed for 24 hours. The resulting solution is left for 18 hours at room temperature, and is then cooled to 0–5° C. and stirred while sodium borohydride (0.8 g.) is added in portions during about 1 hour. After additional stirring for 3 hours, allowing the reaction mixture to reach room temperature, the solvent is removed *in vacuo*. The residue is dissolved in water (30 ml.) and the solution is acidified with acetic acid (5 ml.) to precipitate the reaction product as an oil. The oil is separated and dissolved in hot saturated sodium hydrogen carbonate solution (30 ml.). The solution is filtered hot in the presence of decolorizing carbon and, after cooling, the resulting precipitate is collected by filtration and washed with a minor amount of ice-cold water. After drying and recrystallization from water, the sodium salt of 3-(furyl-(2)-methylamino)-4-(4'-methylbenzyl)-5-sulfamylbenzoic acid is obtained. The purified salt is dissolved in hot water (10 ml.) and the solution is acidified with 4 N acetic acid (2 ml.). After cooling the precipitate is collected by filtration and washed with water. After drying and recrystallization from ethanol, 3 - (furyl-(2)-methylamino)-4-(4'-methylbenzyl)-5-sulfamylbenzoic acid is obtained with a melting point of 234–236° C. (dec.).

EXAMPLE 26

4-(4'-methylbenzyl)-3-(2-pyridyl-(4)-ethylamino)-5-sulfamylbenzoic acid

A mixture of 3-amino-4-(4'-methylbenzyl-5-sulfamylbenzoic acid (1.2 g.), 4-vinylpyridine (1.0 ml.), acetic acid (0.4 ml.) and methanol (5.0 ml.) is refluxed for 3 hours. After cooling, the resulting precipitate is collected by filtration and washed with methanol. After drying and recrystallization from methyl Cellosolve, 4-(4'-methylbenzyl)-3-(2 - pyridyl-(4)-ethylamino)-5-sulfamylbenzoic acid is obtained with a melting point of 227–228° C.

EXAMPLE 27

4-benzyl-3-benzylamino-5-sulfamylbenzoic acid

A mixture of 4 - benzylamino-6-carboxy-3-phenyl-1,2-benzisothiazole-1,1-dioxide (3.02 g., 0.01 mole), 80% hydrazine hydrate (6.0 ml.), potassium hydroxide (2.0 g.), water (4.0 ml.) and diethylene glycol (25 ml.) is stirred and refluxed for 3 hours. The temperature is then during about 1.5 hours raised to 215° C. allowing volatile material to distil off, and finally the reaction mixture is stirred at 215–220° C. for a further 3–4 hours until the nitrogen evolution has ceased. After cooling, the resulting solution is diluted with water (25 ml.) and filtered in the presence of decolorizing carbon. The filtrate is acidified with 4 N hydrochloric acid (12 ml.) and the resulting precipitate is filtered off and washed with water. After drying and recrystallization from a mixture of ethanol and methyl Cellosolve, 4-benzyl-3-benzylamino-5-sulfamylbenzoic acid is obtained with a melting point of 248–249° C. (dec.). The material (IR, analysis) is identical with the material prepared as in Example 7.

EXAMPLE 28

4-benzyl-3-n-butylamino-5-sulfamylbenzoic acid

By replacing in Example 27 4-benzylamino-6-carboxy-3-phenyl-1,2-benzisothiazole-1,1-dioxide by an equimolar amount of 4 - n-butylamino-6-carboxy-3-phenyl-1,2-benzisothiazole-1,1-dioxide, 4-benzyl-3-n-butylamino-5-sulfamylbenzoic acid is obtained with a melting point of 234–235° C. The material (IR, analysis) is identical with the material prepared as in Example 20.

EXAMPLES 29–36

By following the procedure described in Example 27 but replacing the 4-benzylamino-6-carboxy-3-phenyl-1,2-benzisothiazole-1,1-dioxides by equimolar amounts of the 5-N-substituted-6-carboxy-3-phenyl - 1,2 - benzisothiazole-1,1-dioxides of the Table I following, the corresponding 4-benzyl-5-sulfamyl-N-substituted-anthranilic acids are obtained.

TABLE I

| Ex. No. | 5-substituent of the 6-carboxy-3-phenyl-1,2-benzisothiazole-1,1-dioxide | N-substituent | M.P., °C. (with dec.) |
|---|---|---|---|
| 29 | 3'-methoxypropylamino | 3'-methoxypropyl | 224–225 |
| 30 | n-Butylamino | n-Butyl | 248–249 |
| 31 | n-Pentylamino | n-Pentyl | 251–252 |
| 32 | Iso-amylamino | Iso-amyl | 251–252 |
| 33 | Benzylamino | Benzyl | 256–258 |
| 34 | 4'-chlorobenzylamino | 4'-chlorobenzyl | 259–261 |
| 35 | 3'-methylbenzylamino | 3'methylbenzyl | 232–234 |
| 36 | β-Phenylethylamino | β-Phenylethyl | 245–246 |

The material prepared as in Example 33 is identical (IR, analysis) with the material prepared as in Example 6.

EXAMPLE 37

Methyl 4-benzyl-3-n-butyl-5-sulfamylbenzoate

To a solution of 4-benzyl-3-n-butyl-5-sulfamylbenzoic acid (0.75 g.) in methanol (15 ml.), concentrated sulphuric acid (0.25 ml.) is added and the mixture is refluxed for 24 hours. After cooling, the resulting precipitate is collected by filtration and washed with cold methanol. After drying and recrystallization from methanol, methyl 4-benzyl-3-n-butyl-5-sulfamylbenzoate is obtained with a melting point of 153.5–155° C.

EXAMPLE 38

Cyanomethyl 4-benzyl-3-n-butyl-5-sulfamylbenzoate

A mixture of 4-benzyl-3-n-butyl-5-sulfamylbenzoic acid (0.72 g.), chloroacetonitrile (0.17 g.), triethylamine (0.22 g.) and dry acetone (7.0 ml.) is refluxed for 24 hours. After cooling, the separated triethylaminehydrochloride is removed by filtration and the filtrate is evaporated *in vacuo*. The residue is triturated with saturated sodium hydrogen carbonate solution (20 ml.) and the resulting crystalline material is collected by filtration and washed with water. After drying and recrystallization from aqueous ethanol, cyanomethyl 4-benzyl-3-n-butyl-5-sulfamylbenzoate is obtained with a melting point of 125–127° C.

What we claim is:

1. As intermediates, compounds of the general formula

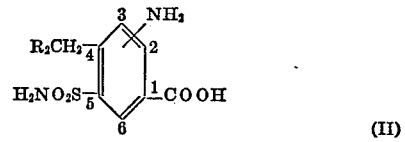

(II)

in which $R_2$ is a member of the class consisting of unsubstituted and halogen and $C_1$–$C_3$ alkyl substituted phenyl radicals.

2. As intermediates 2-amino-4-benzyl-5-sulfamylbenzoic acid, esters with cyanomethanol, benzyl alcohol and $C_1$-$C_6$ alkanols; and salts thereof.

3. As intermediates 3-amino-4-benzyl-5-sulfamylbenzoic acid esters with cyanomethanol, benzyl alcohol and $C_1$-$C_6$ alkanols; and salts thereof.

4. As intermediates 3-amino-4-(4'-methylbenzyl)-5-sulfamylbenzoic acid, esters with cyanomethanol, benzyl alcohol and $C_1$-$C_6$ alkanols; and salts thereof.

5. As intermediates 3-amino-4-(2,4'-dimethylbenzyl)-5-sulfamylbenzoic acid, esters with cyanomethanol, benzyl alcohol and $C_1$-$C_6$ alkanols; and salts thereof.

6. As intermediates 3-amino-4-(4'-chlorobenzyl)-5-sulfamylbenzoic acid, esters with cyanomethanol benzyl alcohol and $C_1$-$C_6$ alkanols; and salts thereof.

References Cited
FOREIGN PATENTS
1,964,503   7/1970   Germany _____ 260—470

LORRAINE A. WEINBERGER, Primary Examiner

P. J. KILLOS, Assistant Examiner

U.S. Cl. X.R.

260—465 D, 470, 518 R, 518 A

PO-1050
(5/69)

UNITED STATES PATENT OFFICE
CERTIFICATE OF CORRECTION

Patent No. 3,816,482   Dated June 11, 1974

Inventor(s) Peter Werner Feit and Ole Bent Tvaermose Nielsen

It is certified that error appears in the above-identified patent and that said Letters Patent are hereby corrected as shown below:

Omission at the head of the patent of Section [30] reading:

-- FOREIGN APPLICATION PRIORITY DATA

June 18, 1970 Great Britain........29,742/70--

Signed and sealed this 3rd day of December 1974.

(SEAL)
Attest:

McCOY M. GIBSON JR.
Attesting Officer

C. MARSHALL DANN
Commissioner of Patents